April 6, 1926.
E. W. CARRA
1,579,594
WOODWORKING MACHINE FOR MAKING RULERS, SET SQUARES, AND THE LIKE
Original Filed August 6, 1923    4 Sheets-Sheet 1
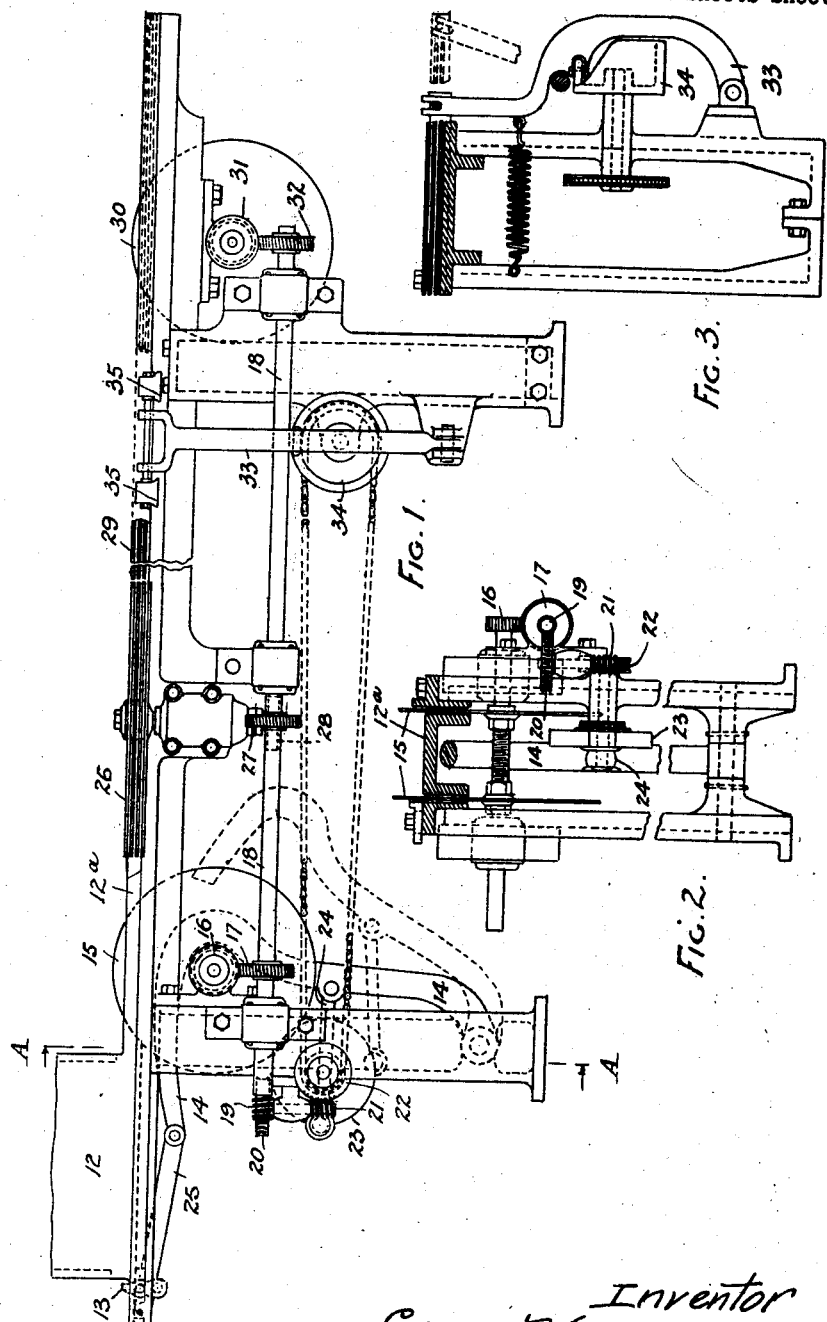

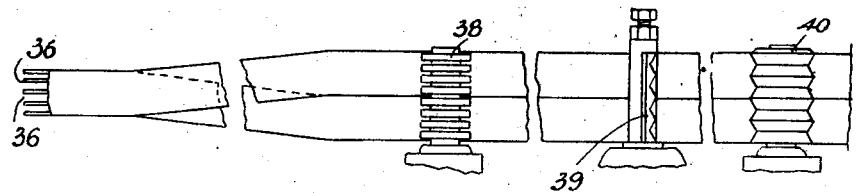
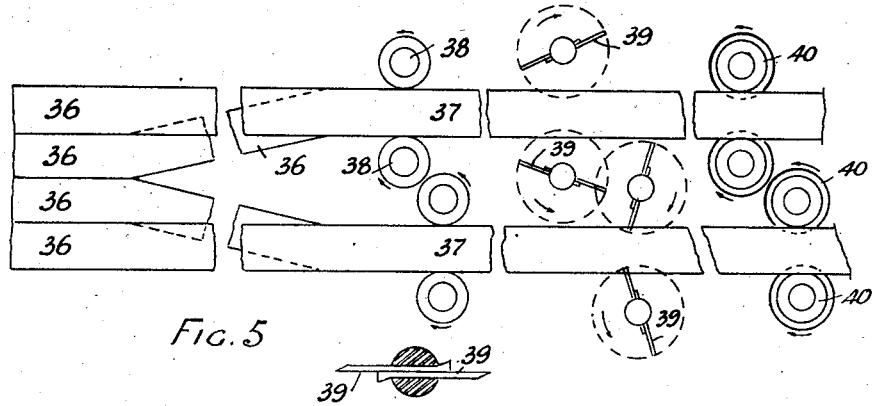
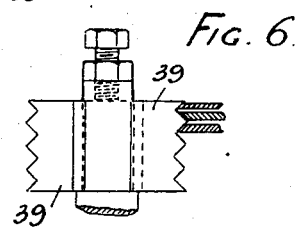

April 6, 1926. 1,579,594
E. W. CARRA
WOODWORKING MACHINE FOR MAKING RULERS, SET SQUARES, AND THE LIKE
Original Filed August 6, 1923 4 Sheets-Sheet 3

Inventor
Edward Walter Carra
by P. Singer
Atty

April 6, 1926.  
E. W. CARRA  
1,579,594  
WOODWORKING MACHINE FOR MAKING RULERS, SET SQUARES, AND THE LIKE  
Original Filed August 6, 1923   4 Sheets-Sheet 4

Inventor  
Edward Walter Carra  
by P. Singer

Patented Apr. 6, 1926.

1,579,594

UNITED STATES PATENT OFFICE.

EDWARD WALTER CARRA, OF ABBOTSFORD, VICTORIA, AUSTRALIA.

WOODWORKING MACHINE FOR MAKING RULERS, SET SQUARES, AND THE LIKE.

Application filed August 6, 1923, Serial No. 656,144. Renewed February 26, 1926.

*To all whom it may concern:*

Be it known that I, EDWARD WALTER CARRA, a subject of the King of Great Britain, residing at Abbotsford, Victoria, Australia, have invented new and Improved Woodworking Machines for Making Rulers, Set Squares, and the like, for which I have made application for patent in Australia dated 21st of October, 1922, and of which the following is a specification.

My invention relates to the manufacture of flat rulers, set squares and other like articles in a continuous way in a machine.

Commencing with single pieces of wood cut to the required length the invention provides means for feeding such pieces forwardly to horizontally arranged parting saws that cut the piece into thin broad slabs.

Means are provided for displacing surplus pieces by a laterally moving member, after which the pieces on the floor of the machine pass to vertical saws that part the slabs into the required widths which are then bevelled.

A further object of the invention is the provision of means for stereotyping the graduated markings upon the rulers or other articles and, if necessary, for inking the printing means. Novel means is also employed for counting the rulers as same are made.

In the accompanying drawings—

Fig. 1 is a side elevation of the parting machine.

Fig. 2 an end sectional elevation on line A—A, Fig. 1.

Fig. 3 illustrate the lateral ejection means.

Fig. 4 is a side elevation of the bevelling mechanism that is attached as a continuation to the machine shown in Fig. 1.

Fig. 5 is a plan of same, and

Fig. 6 shows the bevelling cutters.

Figure 7:
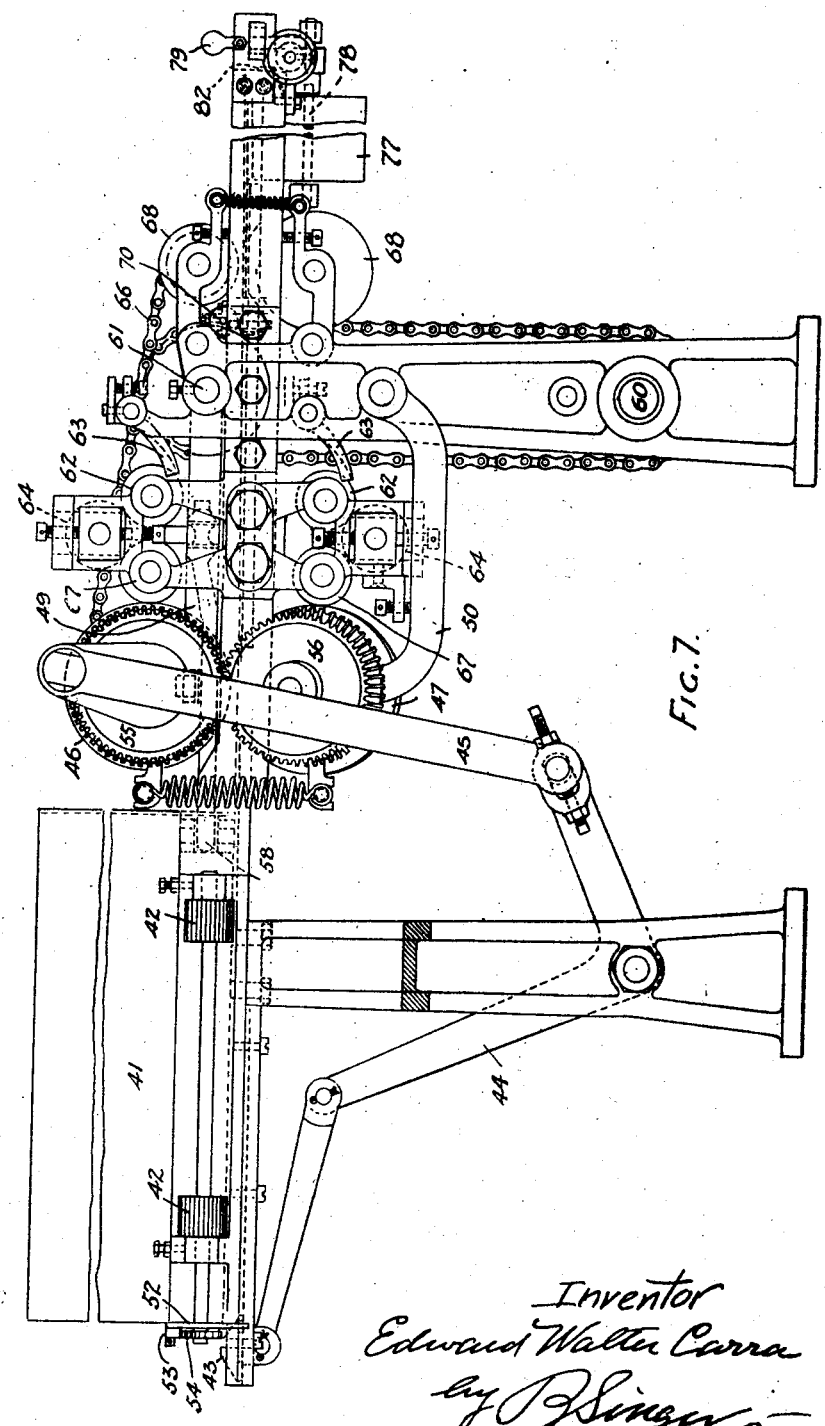
Fig. 7 is a side elevation of the rotary stereotyping machine adapted for rulers.
Figure 9:
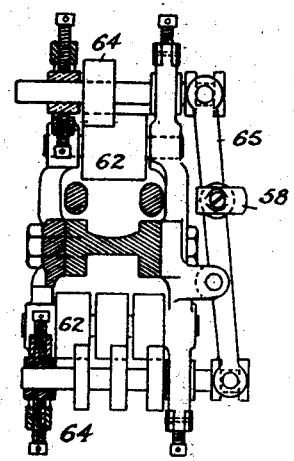
Fig. 9 is also a sectional view through the inking rollers.
Figure 8:
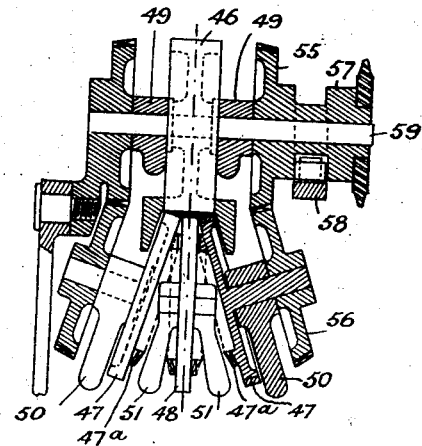
Fig. 8 is a sectional view taken through the stereotyping wheels.
Figure 10:
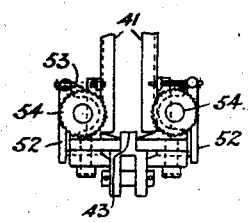
Fig. 10 shows a feeding means in elevation.
Figure 11:
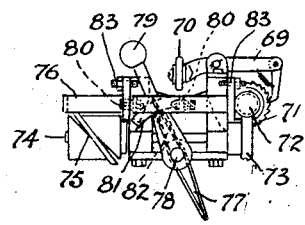
Fig. 11 is an end view of the counting mechanism.

Referring now to Figs. 1, 2 and 3, the hopper 12 receives a supply of wooden blocks in a vertical stack that rests on the machine bed 12$^a$. A finger 13 connected to a rocker arm 14 pushes a piece at a time along the bed towards a pair of edge trueing saws 15. Motion is imparted to the arm through gear wheels 16 and 17, the latter on the countershaft 18, worm 19 on same shaft, worm wheel 20, a worm 21 on the worm wheel shaft and worm wheel 22. The wheel 22 is affixed to a shaft driving a crank disc 23 which is attached to the rocker arm 14 by a connecting rod 24, the outer end of the bent rocker arm being connected to the finger through a link 25. As the arm rocks, the finger impinges on a piece to push it forward in the machine and as one piece leaves the chute another falls in front of the finger and behind the first piece against which it is pushed by the finger. Thus, the pieces are kept moving continuously through the machine and come first against the saws 15 that smooth off the side edges to give the required and exact width thereto. The timber then passes to a number of saws 26 mounted on a vertical spindle driven from the countershaft 18 and skew gear wheels 27 and 28. These saws cut the wood into a number of one-eight inch slabs which pass along the bed between division plates 29, emerging opposite to the lateral ejectment means. At this point, each alternate pile of pieces that are not wanted for making rulers are pushed sideways into a hopper for separate treatment in the manufacture of set squares, it being only necessary to cut the square pieces diagonally by hand to make the articles. The stack of oncoming pieces on the bed passes to vertical saws 30 which part same into the widths required for rulers. These saws are driven through skew gears 31 and 32. The lateral ejector consists of a rocking bar 33 that is operated through a cam 34 itself driven through suitable gearing in the machine. The head of the arm is provided with projections adapted to engage the stacked pieces while moving in slides 35 that are set to the required height for the arm to laterally remove the stack opposite it while the next stack passes on to the saws 30. The saws employed are of the kind that will make a dressed cut so that it will not be necessary to afterwards submit the pieces to buzzers or planes.

Refering now to Figs. 4 and 5, the parted pieces, after leaving the saws 30 are pushed by those behind into runways 36, of which there can be four or more in multiples of 2. One of each pair of these ways diverges so as to come under the other into two parallel ways 37 each carrying eight pieces between the rubber rollers 38 by which same are gripped and fed between the bevelling knives 39 from whence they pass to the second set of rubber rollers 40 and out of the machine as finished, but unmarked rulers, such as are used in schools and juvenile carpentry sets.

As these rulers pass from the parting machine they fall into the hopper box 41 of the stereotype machine of Fig. 7, and rest in a pile upon the toothed wheels 42. These latter are adapted to be rotated inwards in order that with each movement the rulers supported thereon will one by one be fed on to the machine bed. As each piece comes to rest it will be engaged by the finger 43, that is reciprocated through the bell crank 44 and crank lever 45, and pushed forward between the stereotype wheels 46, 47 and 48 which are carried respectively on the ends of pivoted levers 49, 50 and 51. The wheels are engraved on their peripheries with the desired markings by which the edges of the rulers will be calibrated. The wheels 42 are rotated by the return movement of the finger 43 pushing out by impingement small crank levers 52 which turn the wheels 42 through a pawl 53 and ratchet 54.

The stereotype wheels 46 and 47 are interconnected by gear wheels 55 and 56 the gear wheel 55 on the one side being attached to a boss 57 provided with an eccentric cam that engages end of lever 58 provided for the purpose of oscillating the ink roller mechanism. The shaft 59 carrying the above mentioned gearing is driven through suitable chain and sprocket gearing from the main shaft 60 and countershaft 61 on the frame of the machine. Motion is imparted to stereotype wheel 48 from wheel 47 by means of bevelled tooth gearing 47ª attached to each wheel.

The inking mechanism is the same as usually appertains to ordinary printing machines and consists of three sets of rollers, the first of which 62 picks up the ink from the tray 63, the second roller 64 having an oscillating motion given it through the rocker bar 65 from lever 58, before referred to, spreads the ink from roller 62 evenly on to roller 67 and then on to the surface of stereotype wheels. The inking rollers 62, 64 and 67 and tray 63 for inking stereotype wheels 47 and 48 are parted into three and are so adapted that each different part may be in a different colored ink.

After passing the stereotype wheels the ruler is drawn out by feed roller 68 at a slightly greater rate of movement than it passed the said wheels, the wheel 68 receiving its motion from the countershaft 61 and chain 66.

In order to provide for counting the rulers or pieces as same emerge, a rocker bar 69 is pivoted on the frame and provided with a small roller 70 which rests on the ruler as it passes through the feed roller 68 and is adapted to lift the pawl of a ratchet wheel 71 as it drops over the end of each piece and to turn the wheel through the pawl as it mounts the end of the next piece. Motion is imparted through the ratchet, worm 72, worm wheel 73 and spindle 74 to an elliptical collar cam 75 which is in engagement with a bar 76. The gearing is arranged in such a way that while the ratchet 71 moves one hundred and forty-four times the cam drum will have moved through 180 degrees or half one complete revolution, and consequent upon such movement, the bar 76 moves the complete length of its stroke after a gross of rulers has passed below the roller 70. On the bed of the machine, the centre of which at this point is removed to allow the rulers to fall through into receptacles placed below, a deflecting vane 77 is pivotally mounted on a longitudinal spindle 78. To an extension of 78, a weighted lever 79 is loosely mounted and in such a way as to be susceptible of movement from impingement by projections 80 on the bar 76. The weighted lever 79 is provided with a quadrant arm 81 adapted to engage a finger 82 attached to vane 77 and the lever rests against adjustable stops 83 on the machine frame.

The transverse movement of bar 76 will move the weighted lever, eventually, into a vertical position, from which position the force of gravity causes it to incline in the opposite direction and to rest against the opposite stop 83, carrying with it the vane 77. The oncoming rulers are then deflected into a receptacle holding one gross, the return movement of the vane mechanism being repeated during the passage of the next gross of rulers.

Having now described my invention what I claim as new and desire to secure by Letters-Patent is—

1. In the manufacture of flat rulers, a chute into which the wooden blocks to be parted are stacked, a reciprocating finger that impinges on a block and moves it along the machine bed, means for actuating the finger, edge trimming saws past which the block is pushed, horizontal saws for parting the block into slabs, vertical saws for parting the slabs into pieces the size of the rulers, a lateral ejectment rocking bar for displacing surplus slabs, a cam impinging thereagainst, means for rotating the cam and means for reacting the bar after each forward movement.

2. In the manufacture of flat rulers, a chute into which the wooden blocks to be parted are stacked, a reciprocating finger that impinges on a block and moves it along the machine bed, means for actuating the finger, edge trimming saws past which the block is pushed, horizontal saws for parting the block into slabs, vertical saws for parting the slabs into pieces the size of the rulers, laterally positioned runways through which the pieces are pushed, one of each pair of said ways diverging from and passing under the other and sideways bevelling knives and rubber gripping rollers that lead the pieces to and from said knives.

In testimony whereof I have signed my name to this specification.

EDWARD WALTER CARRA.